(12) United States Patent
Lee

(10) Patent No.: US 7,386,288 B2
(45) Date of Patent: Jun. 10, 2008

(54) INPUT SIGNAL DETECTING APPARATUS AND METHOD

(75) Inventor: Tae Won Lee, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 733 days.

(21) Appl. No.: 11/002,001

(22) Filed: Dec. 1, 2004

(65) Prior Publication Data

US 2005/0118967 A1 Jun. 2, 2005

(30) Foreign Application Priority Data

Dec. 1, 2003 (KR) .................. 10-2003-0086339

(51) Int. Cl.
*H04B 1/06* (2006.01)
(52) U.S. Cl. .................. 455/234.1; 455/245.1; 455/246.1; 455/226.1; 375/345
(58) Field of Classification Search .......... 455/234.1
See application file for complete search history.

(56) References Cited

U.S. PATENT DOCUMENTS 5,940,143 A * 8/1999 Igarashi et al. ............. 348/678
6,088,583 A * 7/2000 Shimizu et al. ............. 455/235.1
2006/0205372 A1* 9/2006 Bouillet et al. ............. 455/234.1

* cited by examiner

*Primary Examiner*—Lana Le
*Assistant Examiner*—Ajibola Akinyemi
(74) *Attorney, Agent, or Firm*—Lee, Hong, Degerman, Kang & Schmadeka

(57) ABSTRACT

An input signal detecting apparatus and method in a digital receiver is provided. The input signal detecting apparatus includes an outer AGC for receiving an input signal and thereby controlling gains of RF and IF AGC amplifiers and generating an IF AGC gain value; an inner AGC for receiving the input signal and thereby generating an inner AGC gain value; and an input signal detector for receiving the input signal, a predetermined input signal power reference value, the IF AGC gain value and the inner AGC gain value and thereby generating a signal for representing a condition of stability of an input signal and a signal for representing a condition of existence of an input signal, thereby making it possible to reduce the channel information scanning time and determine a time at which an after-edge recoverer should be activated, by using the condition of existence of an input signal and the condition of stability of an input signal.

28 Claims, 8 Drawing Sheets

US 7,386,288 B2

INPUT SIGNAL DETECTING APPARATUS AND METHOD

This application claims the benefit of the Korean Application No. 10-2003-0086339 filed on Dec. 1, 2003 which is hereby incorporated by reference.

BACKGROUND OF THE INVENTION

1. Field of the Invention

The present invention relates to an input signal detector, and more particularly, to an input signal detecting apparatus and method for detecting whether or not an input signal exits in a digital television (TV).

2. Discussion of the Related Art

Recently, with conversion of an analog broadcast (such as a terrestrial broadcast and a cable broadcast) into a digital broadcast, a time required for scanning channel information is greatly increased as compared to the conventional analog broadcast. This is because 5 through 12 broadcasts exit in one channel and empty channels may exist in a broadcast band in case of the digital broadcast.

Additionally, in case of the cable broadcast, channel information is frequently changed according to a local broadcast station's condition, whereby channel information should be more frequently scanned.

A problem of the prior art at the time of the channel information scanning will now be described with reference to the accompanying drawings.

FIG. 1 is a block diagram of a vestigial sideband (VSB) receiver according to an advanced television systems committee (ATSC) standard of a general digital TV.

A VSB receiver shown in FIG. 1 is an example of a receiver that uses an automatic gain controller (AGC) for directly controlling gains of a radio frequency (RF) and an intermediate frequency (IF).

Referring to FIG. 1, the VSB receiver is constructed to include a tuner 1, an IF AGC amplifier 2 and a VSB demodulator (VSB Rx chip) 3. The tuner 1 tunes only a channel frequency selected by a user from RF signals received through an antenna, and then controls the tuned RF signal to thereby convert the tuned RF signal into an IF signal. The IF AGC amplifier 2 controls and amplifies a gain of the IF signal. The VSB demodulator 3 VSB-demodulates the gain-controlled IF signal, and outputs gain control signals (RF AGC control, IF AGC control) respectively to the tuner 1 and the IF AGC amplifier 2, and directly controls gains of the RF and IF signals. Here, the VSB demodulator 3 is equipped with an AGC 3-1 for generating an IF gain control signal (IF AGC control) and an RF gain control signal (RF AGC control).

An operation of the VSB receiver will now be described with reference to FIG. 1.

Firstly, when a VSB-modulated RF signal is received through the antenna, the tuner 1 selects a desired channel frequency by tuning and then converts a tuned RF signal into an IF signal to thereby output the IF signal to the IF AGC amplifier 2. The IF AGC amplifier controls a gain of the IF signal to thereby output the gain-controlled IF signal to the VSB demodulator 3. The VSB demodulator 3 VSB-demodulates the gain-controlled IF signal.

At this time, in order to maintain a constant signal gain, the AGC 3-1 of the VSB demodulator 3 compares the strength of the VSB-demodulated signal with a pre-stored gain information value. If a gain of the received signal is determined to be small from the result of the comparison, the VSB demodulator 3 generates a gain-up signal for increasing the received signal's gain. Otherwise, if a gain of the received signal is determined to be large from the result of the comparison, the VSB demodulator 3 generates a gain-down signal for decreasing the received signal's gain. The VSB demodulator 3 then outputs IF gain control signals (the gain-up signal and the gain-down signal) to the IF AGC amplifier 2.

The IF AGC amplifier 2 increases or decreases a gain of the IF signal according to the gain-up signal or the gain-down signal to thereby cause an IF signal to have a desired gain.

In an actual gain control method, after a gain is set to a maximum gain that the VSB receiver can have at the power-on time or at the time of the channel change, the tuner 1 controls a gain of the RF signal through the RF gain control signal in advance to the strength of an input signal.

If the strength of an output signal of the VSB demodulator 3 is not a desired strength even though a gain control capability of the tuner 1 reach the limit, the VSB demodulator 3 controls a gain of the IF AGC amplifier 2 through the IF gain control signal.

FIG. 2 is a graph illustrating an operational area and gain curves of the AGC 3-1 according to signal strength.

Referring to FIG. 2, the operational area is classified into a weak electric field area, a middle electric field area and a strong electric field area according to the strengths of input signals.

That is, an RF gain is maximally decreased and an IF gain is adjusted in the strong electric field area, whereby a saturation of an amplifier or a mixer is prevented.

Also, an IF gain is maintained at a proper magnitude and an RF gain is adjusted in the middle electric field area. An RF gain is maximally increased and an IF gain is adjusted in the weak electric field area.

In the weak/middle/strong electric field areas, an input range is classified into a noise range, a validity input range and a saturation range.

The validity input range indicates the Max/Min strengths of input signals that the VSB receiver can receive. The noise range indicates the strengths of input signals that the receiver cannot discriminate from a noise because the input signal is zero or very weak.

The saturation range means the strengths of input signals that exceed an input range of the receiver of the amplifier to thereby induce a saturation state because the input signal is too strong. In this case, the input signals are distorted, and the receiver cannot normally receive the distorted input signals.

The conventional VSB receiver having such a gain curve is diverged if a symbol recoverer, a carrier recoverer and an equalizer are operated even when an input signal is too weak for its symbol to be detected. On the contrary, when an input signal is too strong not to be saturated with respect to the input range, the input signal is distorted and the conventional VSB receiver cannot normally recover the distorted input signal.

In addition, during the channel information scanning, the conventional VSB receiver recovers a symbol, decodes transmitted data from the symbol, and then waits for a constant while until en error does not exist. Thereafter, the conventional VSB receiver checks whether or not a broadcast signal is generated to thereby obtain channel information. Accordingly, the conventional VSB receiver inefficiently waits for a constant while at all times even when no channel exists, to thereby greatly increasing a time required for scanning channel information. Actually, the channel information scanning requires several tens of minutes, thereby causing the user's inconvenience.

SUMMARY OF THE INVENTION

Accordingly, the present invention is directed to an input signal detecting apparatus and method that substantially obviates one or more problems due to limitations and disadvantages of the related art.

An object of the present invention is to provide an input signal detecting apparatus and method that determines whether or not an input signal is received at a receiver by using a gain compensation signal received from an AGC, and determines a stability of the input signal from power thereof, thereby preventing the divergence or unstable state of the receiver and reducing a time required for scanning channel information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an input signal detecting apparatus in a digital receiver includes: an outer AGC for receiving an input signal and thereby controlling gains of RF and IF AGC amplifiers and generating an IF AGC gain value; an inner AGC for receiving the input signal and thereby generating an inner AGC gain value; and an input signal detector for receiving the input signal, a predetermined input signal power reference value, the IF AGC gain value and the inner AGC gain value and thereby generating a signal for representing a condition of stability of an input signal and a signal for representing a condition of existence of an input signal.

The outer AGC may include: a gain error detector for receiving the input signal and the predetermined input signal power reference value and thereby generating a gain error value; and a loop filter for accumulatively compensating the generated gain error value and thereby generating a gain compensated value.

The inner AGC may include: an AGC error detector for detecting a gain error value; an IF loop filter for accumulating the gain error value and thereby generating an inner AGC gain compensation value; and a multiplier for multiplying the inner AGC gain compensation value by the input signal and thereby generating a gain compensated input signal.

The inner AGC may have an operational area including a part of a noise range or a saturation range.

The input signal detector may include: a segment signal power condition detector for receiving the input signal and the predetermined input signal power reference value and thereby generating a condition of stability of an input signal; and an AGC operational range detector for receiving the IF AGC gain value and the RF AGC gain value and thereby generating a condition of existence of an input signal.

The segment signal power condition detector may compare the input signal with input signal Max/Min reference values generated from the predetermined input signal power reference value to thereby generate the condition of stability of an input signal.

The input signal Max reference value may be 2 through 8 times the average power value, and the input signal Min reference value may be 0.5 through 0.125 times the average power value.

The AGC operational range detector may include: an AGC gain selector for selecting one of the IF AGC gain value and the inner AGC gain value; and a comparator for determining a strength of the input signal by using the selected gain value and thereby generating a signal for representing a condition of existence of an input signal.

In another aspect of the present invention, an input signal detecting method in a digital receiver includes the step of: receiving an input signal and thereby controlling gains of RF and IF AGC amplifiers and generating an IF AGC gain value that is an outer AGC gain value; receiving the input signal and thereby generating an inner AGC gain value; and receiving the input signal, a predetermined input signal power reference value, the IF AGC gain value and the inner AGC gain value and thereby generating a signal for representing a condition of stability of an input signal and a signal for representing a condition of existence of an input signal.

Accordingly, the present invention the present invention can reduce the channel information scanning time and determine a time at which an after-edge recoverer should be activated, by using the condition of existence of an input signal and the condition of stability of an input signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
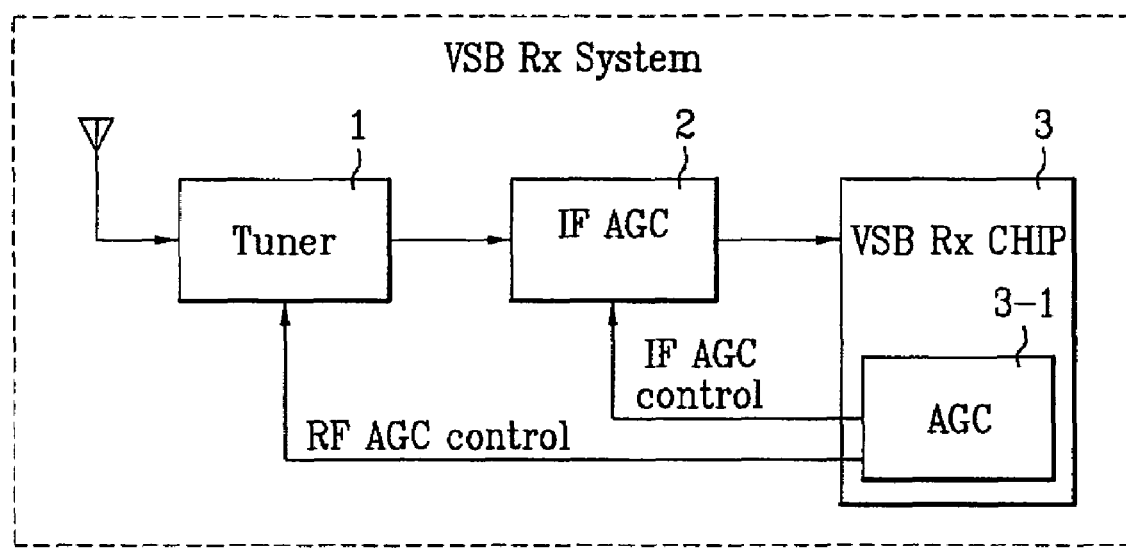
FIG. 1 is a block diagram of a general VSB receiver.
Figure 2:
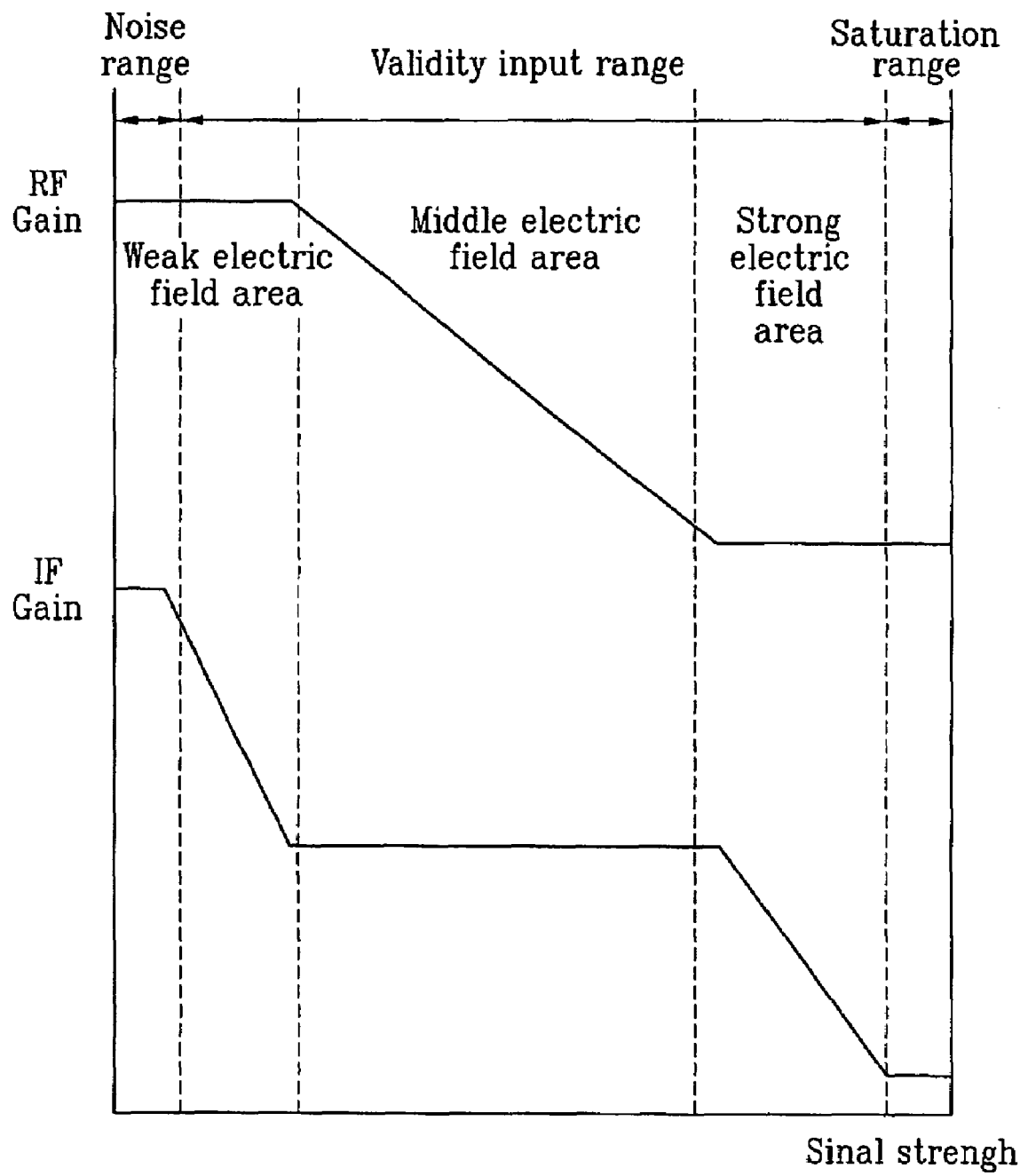
FIG. 2 is a graph illustrating an operational area and gain curves of a conventional AGC.
Figure 3:
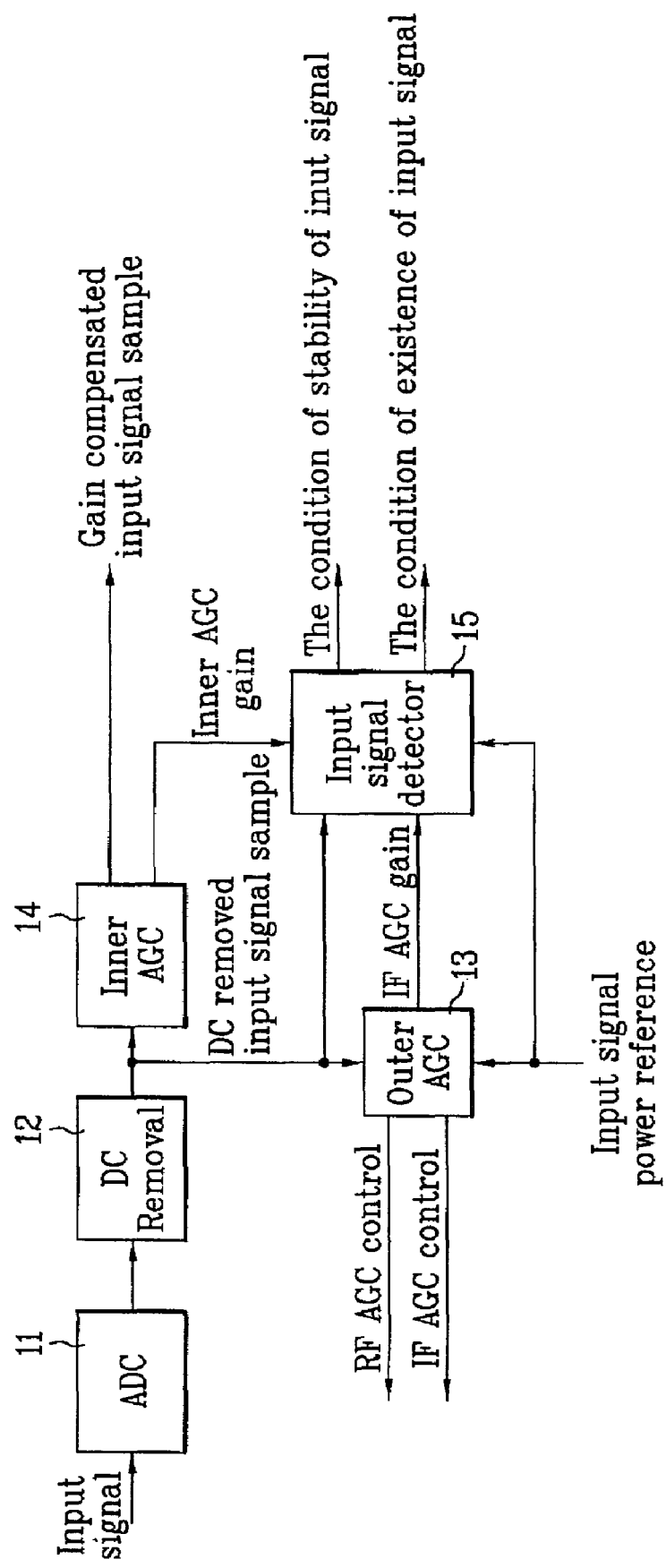
FIG. 3 is a block diagram of an input signal detecting apparatus having an AGC according to an embodiment of the present invention.

FIG. 3 is a block diagram of an input signal detecting apparatus having an AGC according to an embodiment of the present invention.

Referring to FIG. 3, the input signal detecting apparatus is constructed to include an analog-to-digital converter (ADC) 11, a direct current (DC) remover 12, an inner AGC 14, an outer AGC 13 and an input signal detector 15. The ADC 11 converts analog input signal into a digital signal. The DC remover 12 removes a DC component generated at the ADC or the outside. The inner AGC 14 rapidly compensates a gain of the DC removed input signal sample. The outer AGC 13 adjusts a gain of a tuner or an IF amplifier located at the outside. The input signal detector 15 receives the DC removed input signal sample, an IF AGC gain and an inner AGC gain to thereby determine the condition of existence of an input signal and the condition of stability of the input signal.

The so-constructed input signal detecting apparatus samples an input signal, removes a DC component generated at the outside, obtains segment input signal power from the sampled input signal, and determines whether or not the strength of the input signal lies within an noise range by using gain compensation information from an AGC.

In particular, the input signal detecting apparatus maximizes a validity input range of a receiver by alternately selecting gain compensation information from the inner AGC 14 and the outer AGC 13. This operation will now be described in detail with reference to FIG. 4.

Figure 4:
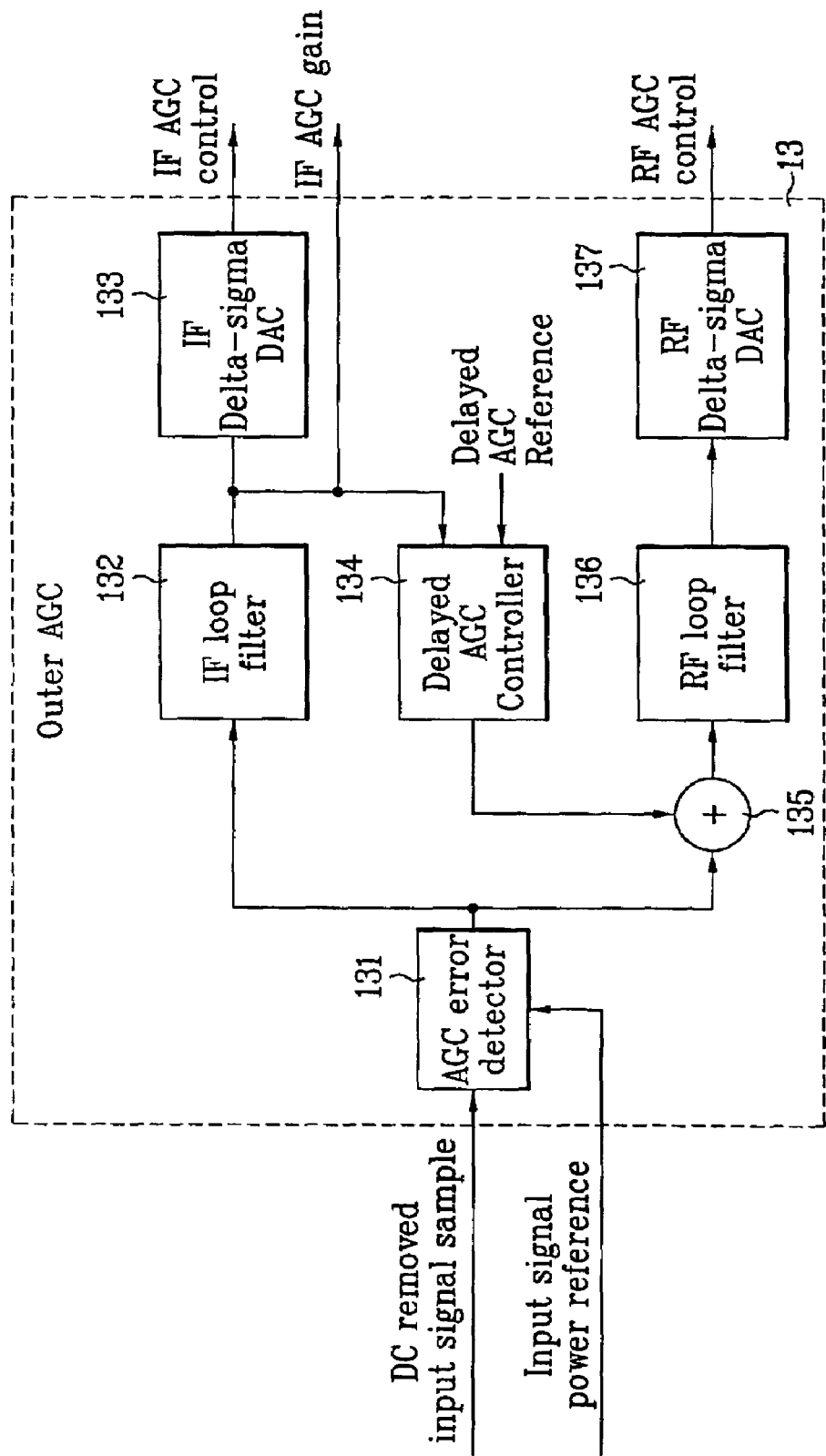
FIG. 4 is a block diagram of an outer AGC of an input signal detecting apparatus according to an embodiment of the present invention.

FIG. 4 is a block diagram of an outer AGC of an input signal detecting apparatus according to an embodiment of the present invention.

Referring to FIG. 4, the outer AGC 13 is constructed to include an AGC error detector 131, an IF loop filter 132, an RF loop filter 136, a 1-bit IF delta-sigma DAC 133, a 1-bit RF delta-sigma DAC 137 and a delayed AGC controller 134.

The AGC error detector 131 squares the DC removed input signal sample received from the DC remover 12, and outputs a gain error value by obtaining a difference between the squared sample value and an input signal power reference value. The IF and RF loop filters 132 and 136 respectively accumulates the gain error value received from the detector 131 to thereby outputs gain compensated values.

The IF and RF delta-sigma DACs 133 and 137 respectively convert the gain compensated values into analog signals to thereby outputs IF and RF AGC control signals. Particularly, an IF AGC gain value of the IF loop filter 132 is outputted to the input signal detector 15.

At this time, the delayed AGC controller 134 receives a delayed AGC reference value to thereby distribute a gain among IF and RF AGCs.

The IF and RF AGC control signals are respectively inputted to the tuner 1 and the IF AGC amplifier 2 and are used for adjusting a gain. The input signal detector 15 uses the IF AGC gain value from the IF loop filter 132, for determining the condition of existence of an input signal.

Figure 5:
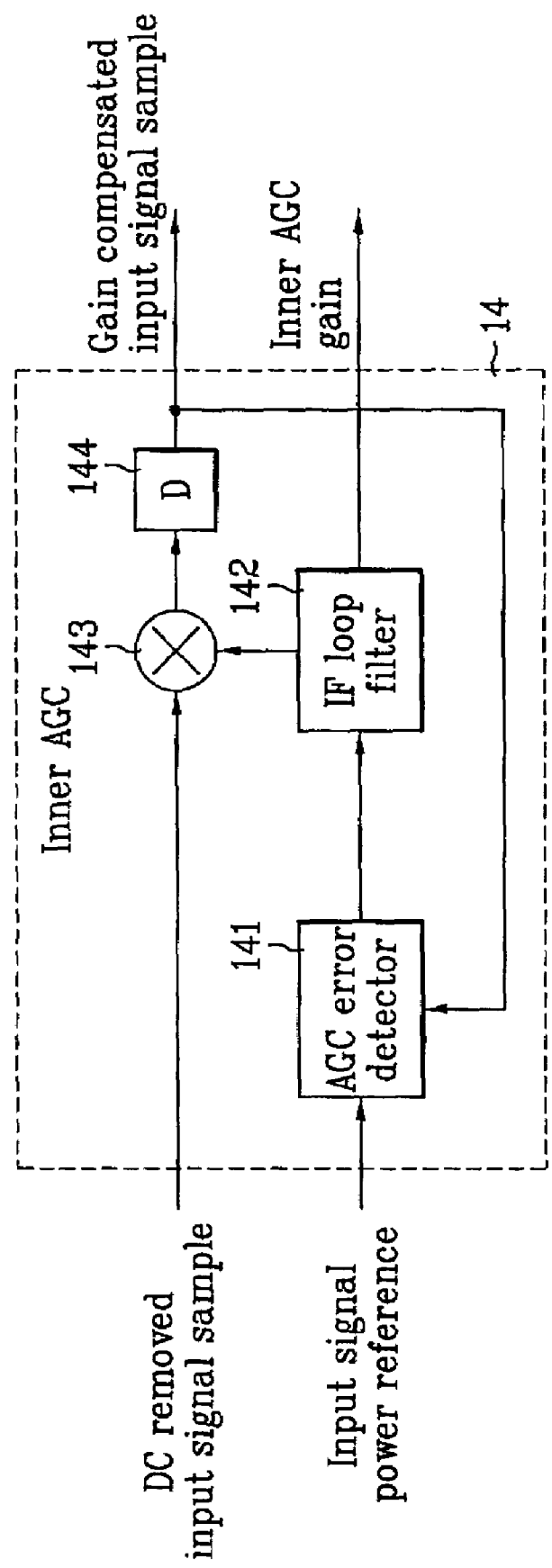
FIG. 5 is a block diagram of an inner AGC according to an embodiment of the present invention.

FIG. 5 is a block diagram of an inner AGC for rapidly compensating a gain of a DC removed input reference sample according to an embodiment of the present invention.

Referring to FIG. 5, the inner AGC 14 is constructed to include an AGC error detector 141 for detecting a gain error, an IF loop filter 142 for accumulating the detected gain error value and outputting a gain compensation value, a multiplier 143 and a delayer 144.

The AGC error detector 141 obtains a difference between an input signal power reference value and a gain compensated input signal sample value to thereby detect a gain error. The IF loop filter 142 accumulates the detected gain error to thereby output a gain compensation value.

The multiplier 143 multiples the DC removed input signal sample by the gain compensation value.

The delayer 144 delays the gain compensated input signal sample value.

The delayed input signal sample value is fed back to the AGC error detector 141 and is used for obtaining a gain error.

The gain compensation value of the IF loop filter 142 is an inner AGC gain value outputted to the input signal detector 15.

The inner AGC 14 multiplies the gain compensation value by the DC removed input signal reference value, thereby making it possible to obtain a relatively large validity input range. In particular, the inner AGC 14 is operated by a relative short loop to thereby detect a gain compensation value rapidly.

Figure 6:
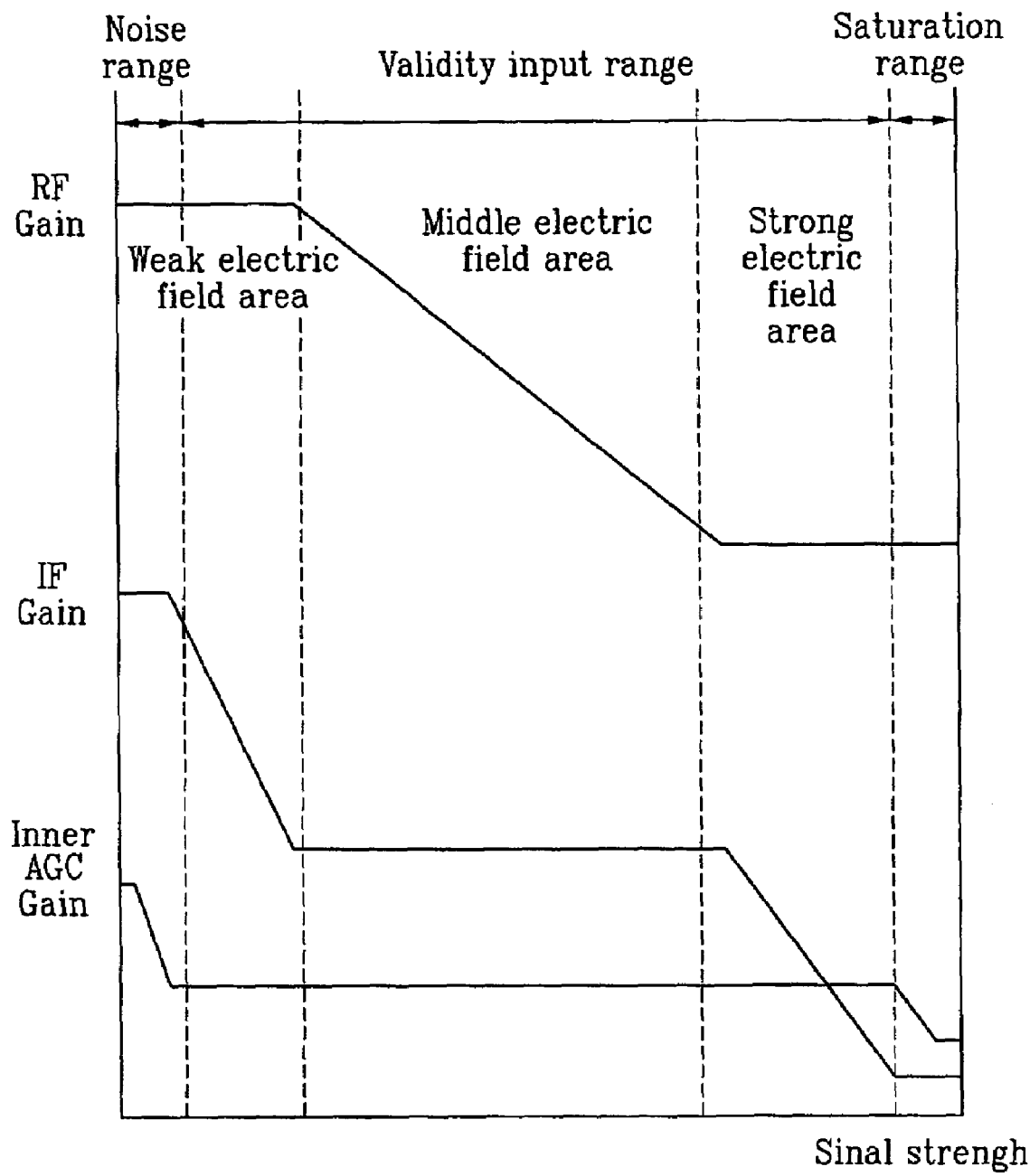
FIG. 6 is a graph illustrating an operational area and gain curves of an AGC according to an embodiment of the present invention.

FIG. 6 is a graph illustrating an operational area and gain curves of the inner AGC according to an embodiment of the present invention.

Referring to FIG. 6, the operational area of the inner AGC 14 includes a noise range in which a noise becomes relatively great because a signal is relatively weak as compared to an RF gain or an IF gain, and a saturation range in which a signal is too strong.

Accordingly, the inner AGC 14 is used for detecting an AMHUM generated in a receiver system having a relatively low SNR or during the DC rectification.

In the meanwhile, the input signal detector 15 receives the gain values obtained by the outer and inner AGCs 13 and 14 and the DC removed input signal sample value to thereby determine the condition of existence of an input signal and the condition of stability of the input signal.

Figure 7:
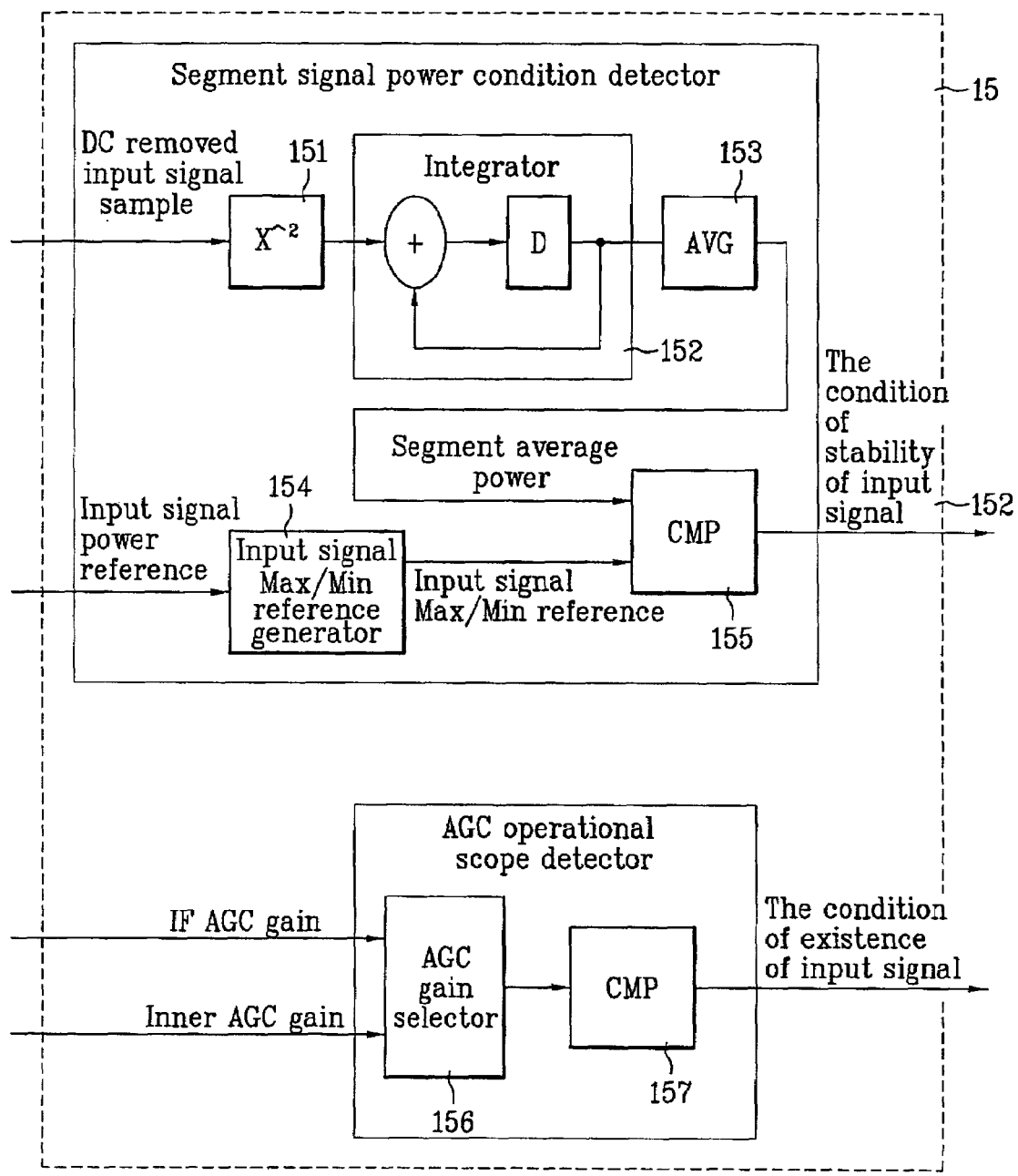
FIG. 7 is a detailed block diagram of an input signal detector according to an embodiment of the present invention.

FIG. 7 is a detailed block diagram of the input signal detector 15.

Referring to FIG. 7, the input signal detector 15 can be broadly classified into a segment signal power condition detector and an AGC operational range detector.

The segment signal power condition detector generates a signal for representing the condition of stability of an input signal by comparing the DC removed input signal sample value with Max/Min reference values obtained from the input signal power reference value.

In detail, a squarer 151 squares the DC removed input signal sample value to thereby generate a power value. An integrator 152 accumulates the squared value of the constant segment. An averaging block (AVG) 153 obtains an average of the accumulated values to thereby output the resulting segment average power value to a comparator 155.

A input signal Max/Min reference generator receives the input signal power reference value, selects 2 through 8 times the input signal power reference value as an input signal Max reference value, selects 0.5 through 0.125 times the input signal power reference value as an input signal Min reference value, and outputs the input signal Max/Min reference values to the comparator 155.

Figure 8:
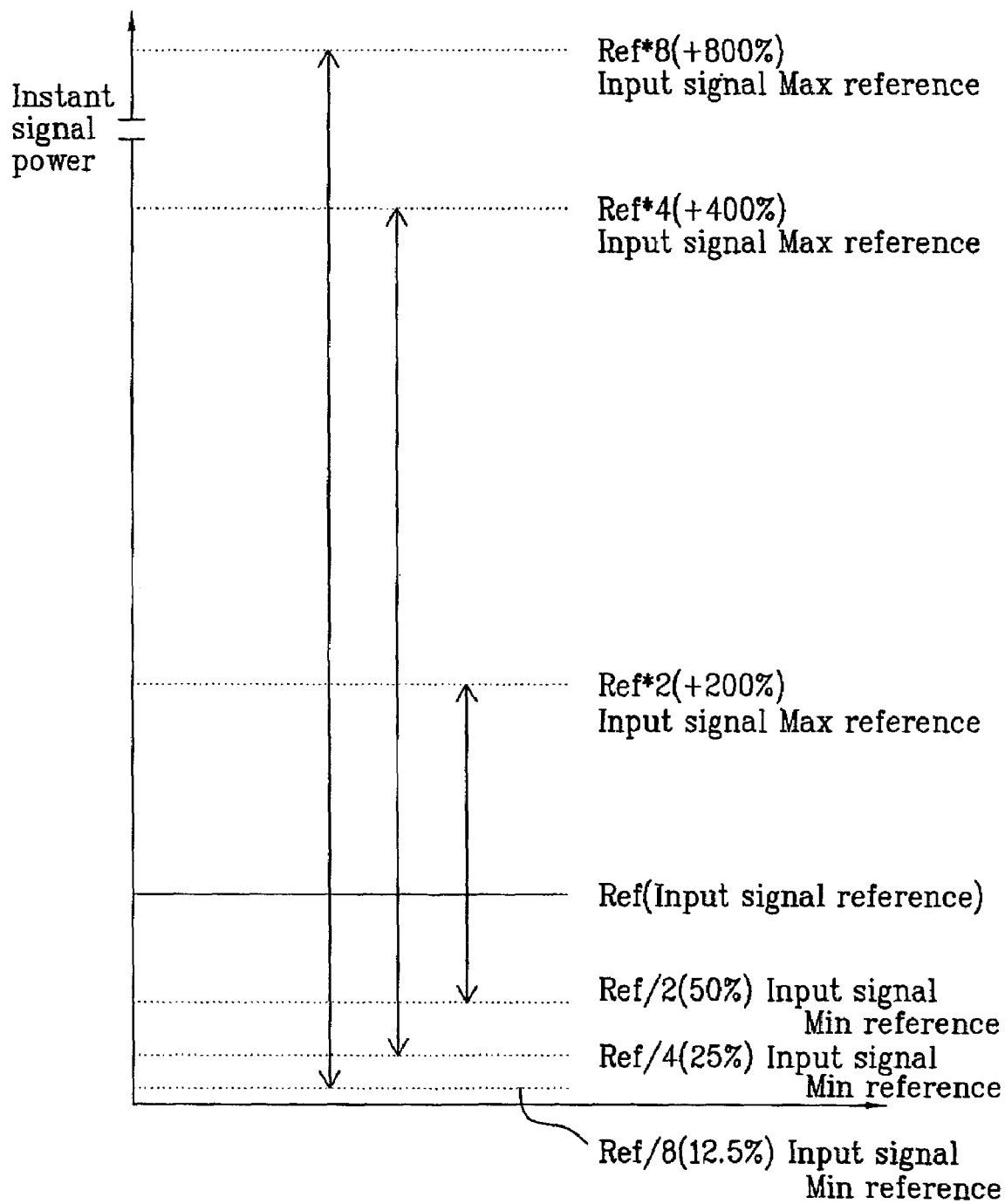
FIG. 8 is a diagram illustrating input signal Max/Min reference values according to an embodiment of the present invention.

FIG. 8 is a diagram illustrating input signal Max/Min reference values according to an embodiment of the present invention.

Referring to FIG. 8, although the input signal Max/Min reference generator 154 multiplies the input signal power reference value by 8 (800%) through ⅛ (12.5%) to thereby output the resulting input signal Max/Min reference values to the comparator 155, the multiplicators are not limited to 8 through ⅛.

The comparator 155 compares the input signal Max/Min reference values with the segment average power value to thereby generate a signal for representing the condition of stability of the input signal.

That is, if the segment average power value lies within the input signal Max/Min reference values, the input signal is determined to be stable. An after-edge recoverer then starts to recover symbols by using the generated input signal sampling value.

Even when an input signal is too weak or strong, the convention method performs an operation of the after-edge recoverer and then determines whether an output video signal actually exists. On the contrary, the present invention performs an operation of the after-edge recoverer only when an input signal is determined to be stable, thereby reducing unnecessary processes during the channel scanning.

In the meanwhile, the AGC operational range detector of the input signal detector 15 receives the previously-obtained IF AGC gain value and an inner AGC gain value to thereby generate a signal for representing the condition of existence of an input signal.

For this, an AGC gain selector 156 of the AGC operational range detector receives and the IF AGC gain value and the inner AGC gain value and then selects one of the both values.

At this time, according to characteristics of a reception channel, the AGC gain selector 156 selects an IF gain compensation value (i.e., the IF AGC gain value) at a channel requiring a large SNR (for example, the 256 QAM channel requires a 28 dB or more SNR), and selects the inner AGC gain compensation value (i.e., the inner AGC gain value) at a channel requiring a small SNR (for example, the QPSK channel requires a 9 dB or more SNR).

The selective use of the IF AGC gain value or the inner AGC gain value according to circumstances maximizes an input range of an input signal.

In the meanwhile, the comparator 157 receives one value selected from the two gain compensation values by the AGC gain selector 156, and then determines whether an input signal actually exists or not by using the selected value to thereby generate a signal for representing the condition of existence of an input signal.

That is, whether or not an AGC is operated within the noise range shown in FIG. 6 can be determined by using the selected gain compensation value. Accordingly, whether an input signal actually exists or not can be determined.

A channel not having an input signal can be skipped by utilizing the signal for representing the condition of existence of an input signal, thereby making it possible to reduce an unnecessarily-required time during the channel information scanning.

In the meanwhile, the present invention can be applied to various wired/wireless communications systems, such as VSB, QAM (quadrature amplitude modulation), QPSK (quadrature phase shift keying) and OFDM (orthogonal frequency division multiplexing) receivers.

As described above, the input signal detecting apparatus and method according to the present invention has the following advantages.

First, the present invention can reduce the channel information scanning time by using the condition of existence of an input signal.

Secondly, the present invention can determine a time at which an after-edge recoverer should be activated, by using the condition of existence of an input signal and the condition of stability of an input signal.

Thirdly, the present invention can increase a validity input range of the receiver by using the inner AGC.

Fourthly, the present invention can prevent the divergence of the receiver when an input signal is severed during reception and can determine a time enabling a single-handed recovery.

It will be apparent to those skilled in the art that various modifications and variations can be made in the present invention. Thus, it is intended that the present invention covers the modifications and variations of this invention provided they come within the range of the appended claims and their equivalents.

What is claimed is:

1. An input signal detecting apparatus in a digital receiver, the apparatus comprising:
    an outer AGC (automatic gain controller) for receiving an input signal and thereby controlling gains of RF (radio frequency) and IF (intermediate frequency) AGC amplifiers and generating an IF AGC gain value;
    an inner AGC for receiving the input signal and thereby generating an inner AGC gain value; and
    an input signal detector for receiving the input signal, a predetermined input signal power reference value, the IF AGC gain value and the inner AGC gain value and thereby generating a signal for representing a condition of stability of an input signal and a signal for representing a condition of existence of an input signal.

2. The apparatus of claim 1, wherein the outer AGC comprises:
    a gain error detector for receiving the input signal and the predetermined input signal power reference value and thereby generating a gain error value; and
    a loop filter for accumulatively compensating the generated gain error value and thereby generating a gain compensated value.

3. The apparatus of claim 2, further comprising a DAC (digital-to-analog converter) for receiving the gain compensated value and then converting the gain compensated value into analog RF and IF AGC control signals.

4. The apparatus of claim 1, wherein the inner AGC comprises:
    an AGC error detector for detecting a gain error value;
    an IF loop filter for accumulating the gain error value and thereby generating an inner AGC gain compensation value; and
    a multiplier for multiplying the inner AGC gain compensation value by the input signal and thereby generating a gain compensated input signal.

5. The apparatus of claim 4, wherein the AGC error detector obtains the gain error value by using a difference between the gain compensated input signal and a predetermined input signal power reference value.

6. The apparatus of claim 4, wherein the inner AGC has an operational area including a part of a noise range or a saturation range.

7. The apparatus of claim 1, wherein the input signal detector comprises:
    a segment signal power condition detector for receiving the input signal and the predetermined input signal power reference value and thereby generating a condition of stability of an input signal; and
    an AGC operational range detector for receiving the IF AGC gain value and the RF AGC gain value and thereby generating a condition of existence of an input signal.

8. The apparatus of claim 7, wherein the segment signal power condition detector compares the input signal with input signal Max/Min reference values generated from the predetermined input signal power reference value to thereby generate the condition of stability of an input signal.

9. The apparatus of claim 7, wherein the segment signal power condition detector comprises:
a squarer for squaring the input signal and thereby generating an input signal power value;
an integrator for accumulating the input signal power value of a constant segment; and
an averaging block for obtaining an average power value that is an average of the accumulated input signal power values.

10. The apparatus of claim 9, wherein the segment signal power condition detector further comprises an input signal Max/Min reference generator for receiving the predetermined input signal power value to thereby generate input signal Max/Min reference values.

11. The apparatus of claim 10, further comprising a comparator for comparing the input signal Max/Min reference values with the average power value to thereby generate a condition of stability of an input signal.

12. The apparatus of claim 10, wherein the input signal Max reference value is 2 through 8 times the average power value.

13. The apparatus of claim 10, wherein the input signal Min reference value is 0.5 through 0.125 times the average power value.

14. The apparatus of claim 7, wherein the AGC operational range detector comprises:
an AGC gain selector for selecting one of the IF AGC gain value and the inner AGC gain value; and
a comparator for determining strength of the input signal by using the selected gain value and thereby generating a signal for representing a condition of existence of an input signal.

15. The apparatus of claim 1, further comprising:
an ADC (analog-to-digital converter) for converting the input signal into a digital signal; and
a DC (direct current) remover for removing a DC component generated at the ADC or an outside.

16. An input signal detecting method in a digital receiver, the method comprising the steps of:
receiving an input signal and thereby controlling gains of RF (radio frequency) and IF (intermediate frequency) AGC amplifiers and generating an IF AGC gain value that is an outer AGC gain value;
receiving the input signal and thereby generating an inner AGC gain value; and
receiving the input signal, a predetermined input signal power reference value, the IF AGC gain value and the inner AGC gain value and thereby generating a signal for representing a condition of stability of an input signal and a signal for representing a condition of existence of an input signal.

17. The method of claim 16, wherein the outer AGC gain value-generating step comprises the steps of:
receiving the input signal and the predetermined input signal power reference value and thereby generating a gain error value; and
accumulatively compensating the generated gain error value and thereby generating a gain compensated value.

18. The method of claim 17, further comprising the step of receiving the gain compensated value and then converting the gain compensated value into analog RF and IF AGC control signals.

19. The method of claim 16, wherein the inner AGC gain value-generating step comprises the steps of:
detecting a gain error value;
accumulating the gain error value and thereby generating an inner AGC gain compensation value; and
multiplying the inner AGC gain compensation value by the input signal and thereby generating a gain compensated input signal.

20. The method of claim 19, wherein the gain error value is obtained by using a difference between the gain compensated input signal and a predetermined input signal power reference value.

21. The method of claim 16, wherein the condition of stability of an input signal is generating by comparing the input signal with input signal Max/Min reference values generated from the predetermined input signal power reference value.

22. The method of claim 16, wherein the step of generating the condition of stability of an input signal comprises the steps of:
squaring the input signal and thereby generating an input signal power value;
accumulating the input signal power value of a constant segment; and
obtaining an average power value that is an average of the accumulated input signal power values.

23. The method of claim 22, further comprising the step of receiving the predetermined input signal power value and thereby generating input signal Max/Min reference values.

24. The method of claim 23, further comprising the step of comparing the input signal Max/Min reference values with the average power value and thereby generating a condition of stability of an input signal.

25. The method of claim 23, wherein the input signal Max reference value is 2 through 8 times the average power value.

26. The method of claim 23, wherein the input signal Min reference value is 0.5 through 0.125 times the average power value.

27. The method of claim 16, wherein the step of generating the condition of existence of an input signal comprises the steps of:
selecting one of the IF AGC gain value and the inner AGC gain value; and
determining strength of the input signal by using the selected gain value and thereby generating a signal for representing a condition of existence of an input signal.

28. The method of claim 27, wherein the IF AGC gain value or the inner AGC gain value is alternatively selected according to SNR (signal-to-noise ratio) characteristics of a reception channel.

* * * * *